United States Patent [19]
Hannan

[11] 3,843,836
[45] Oct. 22, 1974

[54] COLOR MOTION PICTURE FILM PLAYBACK SYSTEM

[75] Inventor: William James Hannan, Pennington, N.J.

[73] Assignee: RCA Corporation, New York, N.Y.

[22] Filed: June 28, 1973

[21] Appl. No.: 374,607

Related U.S. Application Data

[63] Continuation of Ser. No. 250,021, May 3, 1972, abandoned.

[30] Foreign Application Priority Data

Mar. 17, 1972 Great Britain.................. 12696/72

[52] U.S. Cl.......................... 358/45, 358/5, 358/54
[51] Int. Cl. ........................................... H04n 9/04
[58] Field of Search....... 178/5.2, 5.2 D, 5.4, 5.4 ST

[56] References Cited

UNITED STATES PATENTS

| | | | |
|---|---|---|---|
| 3,507,981 | 4/1970 | Ellenberger.................... | 178/5.4 ST |
| 3,535,992 | 10/1970 | Goldmark et al............... | 178/5.2 D |

*Primary Examiner*—Richard Murray
*Attorney, Agent, or Firm*—E. M. Whitacre; William H. Meagher

[57] ABSTRACT

A system for providing color representative signals from a film record wherein color encoded light is projected upon one of two portions of a split target assembly of a scanning image conversion device producing a separate electron beam for each target portion. Means are provided for projecting two successive frames of a record simultaneously onto the first and second split target portions respectively for producing separate brightness and color representative signals.

7 Claims, 6 Drawing Figures

PATENTED OCT 22 1974 3,843,836

COLOR MOTION PICTURE FILM PLAYBACK SYSTEM

This is a continuation of application Ser. No. 250,021, filed 5-3-72 now abandoned.

BACKGROUND OF THE INVENTION

This invention relates to the playback of color picture information contained on an original record such as positive or negative film. More particularly this invention relates to a system for the production of simultaneous color and brightness representative signals from color motion picture film.

In an attempt to overcome electrical and optical problems inherent in most conventional systems for transferring color picture information from an original film record into color television signals, systems have been devised which employ one or two special pick-up tubes to derive simultaneous color signals. In systems employing a single pick-up tube and known methods of color encoding techniques, one composite signal is derived which contains separable portions corresponding to the luminance information, a plurality of color components of the scanned object field, and a separate signal component interspersed throughout the color representative signal components which operates as a reference signal enabling the different color portions to be separated by signal processing circuitry. In systems employing two pick-up tubes, one pick-up tube is employed to derive a monochrome signal and the other pick-up tube is employed to derive a color signal containing separable color portions and reference portions interspersed through the color signal.

In two-tube systems of the above-mentioned type, registration of the two rasters is difficult, often resulting in mismatch between luminance and chrominance information. In the two-tube systems that employ the illumination of one frame of the record and optically producing two images therefrom by beam splitting techniques for projection onto the respective tubes, complex optics are necessary.

The single-tube systems of the above-mentioned type have the disadvantage of bandwidth restriction since the luminance, chrominance and index information must share the limited bandwidth of the image pick-up device. Associated with bandwidth sharing, both luminance and chrominance signals must share the dynamic range of the pick-up device thereby restricting the usable dynamic range of pick-up device. Also, higher frequency components of the luminance signal appear as crosstalk within the color bandwidth.

In single-tube systems employing a sequential scanning device wherein a separate color encoded film record is made from the original film record and the luminance and encoded chrominance information is contained on two adjacent rasters, there is a loss of vertical resolution since information from one raster is delayed to coincide with the information from the other to produce simultaneous color and luminance information.

SUMMARY OF THE INVENTION

A system for producing signals representative of the color and brightness of scene information contained on a film record comprises an image conversion device which includes a split photosensitive electrode assembly including first and second portions having separate signal output terminals and separate electron beams for scanning the split portions of the electrode assembly simultaneously. A means is provided for simultaneously imaging first and second successive frames of the color representative film record onto the first and second photosensitive electrode portions for simultaneously producing during scanning a brightness representative signal obtained from one signal output terminal and a signal representative of the plurality of colors obtained from the other signal output terminal.

A more detailed description of the invention is given in the following specification and accompanying drawings, of which:

FIG. 1 shows a system embodying the invention;

FIGS. 2*a* and 2*b* show curves representative of the color, brightness and index signal frequency spectrum of the system shown in FIG. 1;

DESCRIPTION OF THE INVENTION

Figure 1:
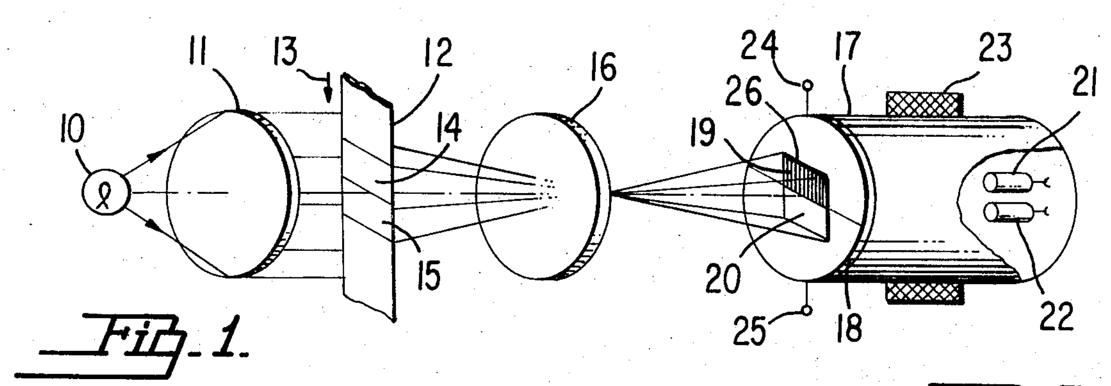

FIG. 1 shows a system embodying the invention. A light source 10 directed through a collimating lens 11 illuminates a color motion picture film 12 moving in the direction of arrow 13. Lens 11 is selected such that two frames (i.e., frames 14 and 15) of film 12 are illuminated. The light passes through frames 14 and 15 and is imaged by lens 16 upon two portions of a split target assembly 20 and 26 of image conversion device 17. The light impinging upon target portion 26 representative of frame 15 is first spatially color encoded by spatial color encoding filter 19. By placing the color encoding filter 19 adjacent the faceplate 18 the filter can be shadow imaged upon the target area 26 and adequate resolution is achieved since a large depth of field can be realized in motion picture systems, i.e., the use of intense light sources allows small aperture optics to be used.

Image conversion device 17 includes two separate electron guns 21 and 22. A single deflection yoke 23, including deflection coils adapted to be energized by suitable sources of scanning current at vertical and horizontal rates is disposed around the envelope of image conversion device 17. The beams from guns 21 and 22 are simultaneously deflected by a common field produced by deflection yoke 23, thereby providing excellent registration of the rasters produced by the beams and eliminating one of the major problems heretofore encountered when two rasters have to be registered. Distortion resulting when proper registration is not achieved is thereby eliminated. Since only one deflection yoke is needed, and since required resolution is relatively low, the cost of the image conversion device 17 and its deflection yoke 23 is comparable to a conventional single frame image pick-up device and yoke assembly. The use of split target assembly also eliminates the need for two separate pick-up tubes. Since the luminance and chrominance images are imaged upon two separate portions 20 and 26 of the target assembly, the crosstalk between the luminance and chrominance signals is eliminated. Also the dynamic range of the device is more than doubled compared to that of a one frame pick-up device, there being no sharing of dynamic range between the chrominance and luminance portions of the image. There is therefore no need to restrict operation to the linear portion of the range to prevent beats between luminance and chrominance signals.

Image conversion device 17 thereby allows a variety of color encoding methods to be used such as that described by Flory and Spong, U.S. Pat. No. 3,637,925, "System and Filter for Encoding Color Images onto Black and White Film."

Spatial colored encoding filter 19 is chosen such that the hue and saturation of the color image is contained as phase and amplitude modulation of a carrier wave derived from scanning. The filter 19 is comprised of color stripes (e.g., dichroic filters, organic dyes or Fabry Pierot filters). These filters have the property of transmitting only red, green or blue light. Alternatively, the color filters can be of the type that allow transmission of cyan, magenta and yellow light. The stripes of filter 19 spatially separate color information and are arranged parallel to each other in groups of threes. The repetition of these colored groups in the direction in which the electron beam is scanned and the scan velocity determine the frequency of the generated electrical color carrier. Filter 19 was chosen to provide a color carrier of 2 MHz and also chosen to modulate the color information in NTSC form. Therefore, if the color image is comprised of red and blue light, filter 19 will spatially separate the red and blue light to provide a signal representative of the red and blue light where the phase angle between the red and blue information corresponds to the appropriate phase angle designated in the standard NTSC color phase diagram. Filter 19 also provides an index carrier wave by varying the transmissivity to white light of the encoding stripes at a spatial rate (i.e., 1 MHz) which is a submultiple of the spatial rate or frequency of the encoding stripes (i.e., 2 MHz).

Conversion of the optical images into electrical signals is achieved as follows: as the electron beam from gun 21 is scanned across target portion 26 a composite electrical signal is produced comprised of a color signal and an index signal. The color signal is comprised of color information contained as phase and amplitude modulation of a suppressed carrier wave. This color signal is modulated in NTSC form but is modulating a 2 MHz carrier wave instead of the standard 3.58 MHz carrier wave. Conversion to a standard NTSC color carrier will be described in conjunction with FIG. 3. The index signal is a carrier wave centered at 1 MHz which is used to compensate for non-linearities in scanning in a manner also to be described in conjunction with FIG. 3.

The output signal obtained from target portion 26 is coupled to a chrominance signal output terminal 24. In a similar manner electron gun 22 produces an electron beam which is scanned across target portion 20 which produces an electrical signal corresponding to the luminance information contained in frame 14. The signal obtained from target portion 20 is coupled to luminance output terminal 25.

Figure 2B:
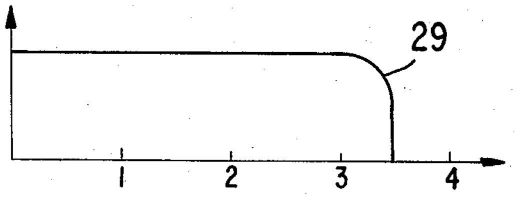
Figure 2A:
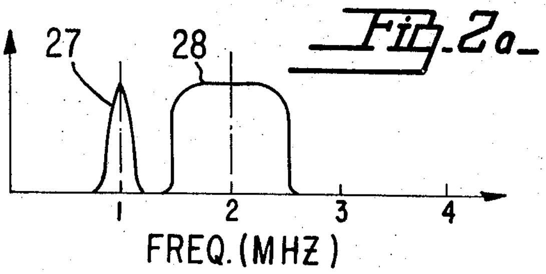

FIG. 2*a* contains two curves 27 and 28 representative of the index signal and chrominance signal developed at chrominance signal output terminal 24. The curve 27 represents the index frequency spectrum centered at 1.0 MHz and ideally extending from 0.9 MHz to 1.1 MHz. In an actual system the spectrum may be somewhat wider than 200 KHz, depending on the nature of the scene, but the 200 KHz bandwidth will be adequate for the intended application. Curve 28 represents the chrominance information frequency spectrum centered at 2.0 MHz and extending from 1.5 MHz to 2.5 MHz.

FIG. 2*b* contains a curve 29 representative of luminance information frequency spectrum developed at luminance output terminal 25. The typical luminance spectrum extends from 0 to 3.5 MHz.

The two-frame simultaneous readout utilized in the system illustrated in FIG. 1 provides an added advantage of very simple playback optics. That is, it avoids the need for beam splitting optics used in conventional two-frame systems. Under dynamic readout conditions a one frame time displacement between luminance and chrominance information is not appreciably noticeable to the viewing eye. Therefore direct two frame readout of the colored film wherein adjacent motion picture film frames are projected onto image conversion device 17, can be achieved without the need for a beam splitter. In other words, the system uses a simplified optical arrangement (i.e., the single lens assembly 16), thereby avoiding the use of complex optics heretofore used in single frame split-beam systems.

Figure 3:
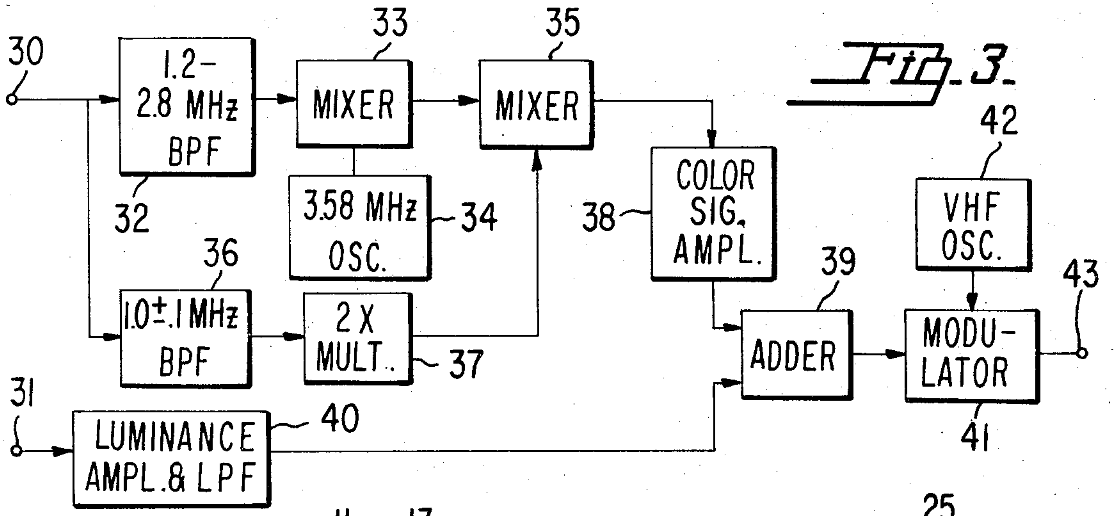
FIG. 3 is a block diagram of a signal processing system for processing the signals obtained from the apparatus of FIG. 1.

FIG. 3 is a block diagram of a signal processing system for processing the signals obtained from image conversion device 17 of FIG. 1.

Chrominance output terminal 24 of image conversion device 17 is coupled to an input terminal 30 which is coupled to bandpass filter 32 wherein the chrominance information is separated from the composite electrical signal. Bandpass filter 32 has a center frequency of 2.0 MHz and a bandpass of 1.6 MHz. The output of bandpass filter 32 is coupled to a mixer 33 wherein the chrominance signal is mixed with a 3.58 MHz carrier frequency obtained from crystal controlled oscillator 34. The output of mixer 33 is a carrier frequency and sidebands centered at 5.58 MHz (3.58 + 2.0 MHz) containing the chrominance information.

Output terminal 24 is also coupled to bandpass filter 36 wherein the index signal is separated from the composite electrical signal. Bandpass filter 36 has a center frequency of 1.0 MHz and a bandpass of typically 0.2 MHz.

The index signal obtained from bandpass filter 36 is coupled to a multiplier 37. In this embodiment of the invention wherein the index frequency was chosen as 1.0 MHz, frequency multiplier 37 multiplies index frequency by two to produce a frequency of 2 MHz — a frequency equal to the color carrier frequency.

The output signal of multiplier 37 is coupled to a mixer 35 where it is heterodyned with a chrominance signal from mixer 33 yielding the difference between the two input signal frequencies of 2 MHz and 5.58 MHz or 3.58 MHz. The output signal of mixer 35 is comprised of a carrier frequency of 3.58 MHz modulated by the chrominance information. The output signal of mixer 35 is amplified by color signal amplifier 38 and coupled to adder 39.

Luminance signal output terminal 25 from FIG. 1 is coupled to terminal 31 which is coupled to low-pass filter amplifier 40. Low-pass filter and amplifier 40 has a bandwidth extending from 0 to approximately 3.5 MHz. This filter is used to provide an amplifier signal comprised of luminance information up to 3.5 MHz and is coupled to adder 39 where the luminance signal is added to the chrominance signal. The output of adder 39 is coupled to modulator 41 which modulates a VHF carrier signal from VHF oscillator 42 with the output of adder 39. Standard television synchronizing and blanking signals are added by conventional apparatus not shown to provide a standard NTSC color signal. The output of modulator 41 at system output terminal 43 provides a VHF signal modulated by the NTSC signal and is suitable for transmission or coupling directly to the antenna terminals of a television set.

The apparatus described in FIG. 3 eliminates detecting to baseband the color information to eliminate frequency variations caused by non-linearities in scanning and putting this information on a carrier wave. The frequency variations caused by scanning non-linearities in the image conversion device 17 of FIG. 1 are cancelled by mixing the color carrier with the index carrier. This compensation occurs since the input signals to mixer 35 are comprised of signals containing the non-linearities variations due to scanning. The subsequent mixing of these signals causes a cancellation of the non-linearities signal at the output of mixer 35.

Figures 4, 5:
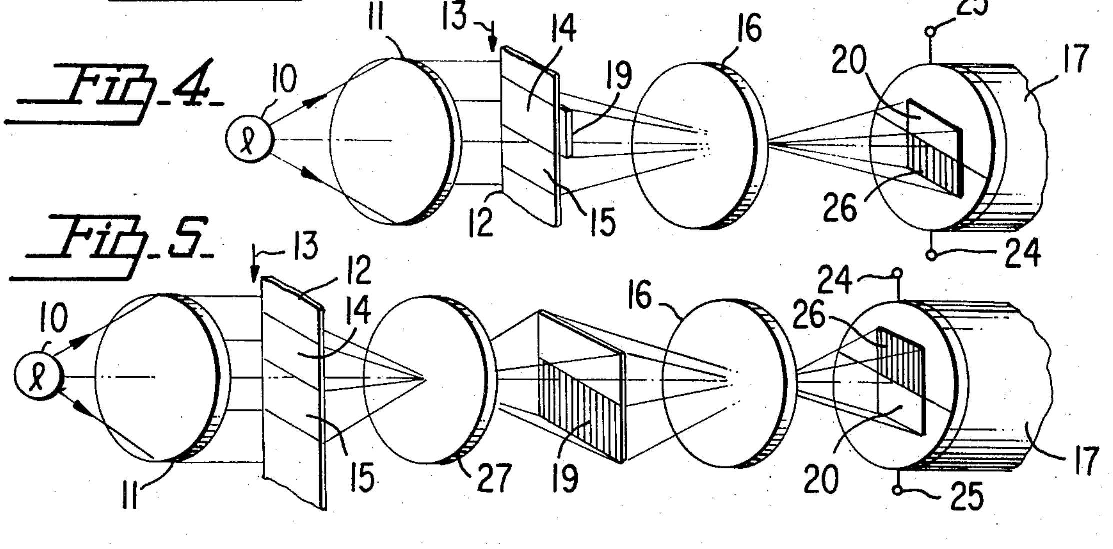
FIG. 4 shows another embodiment of the system illustrated in FIG. 1.
FIG. 5 shows an alternative embodiment of the system illustrated in FIG. 1.

FIG. 4 shows another system embodying the invention. A light source 10 directed through collimating lens 11, illuminates a color motion picture film 12 moving in the direction of arrow 13. Lens 11 is selected such that two frames (i.e., frames 14 and 15) are illuminated. The light passing through frame 14 is color encoded by color encoding filter 19 which is placed substantially adjacent the color film 12. Color encoding filter 19 is similar to the one described in FIG. 1 but it can be larger if the film frame size is larger than the target of the image conversion device. Use of a larger filter allows for better resolution and accuracy in manufacturing of the filter stripes. Light passing through frame 15 is unaffected by the filter 19. Imaging lens 16 focuses the light from frames 14 and 15 upon two portions of a split target assembly 20 and 26 of an image conversion device 17. As the electron beam from gun 22 (not shown) is scanned across target portion 26 a composite electrical signal is produced comprised of a color encoding signal and an index signal. The color encoding signal is comprised of color information contained as phase and amplitude modulation of a suppressed carrier wave. The index signal is used to translate the signal to a standard NTSC color signal form as described above in conjunction with FIG. 3. The output from target portion 26 is coupled to chrominance output terminal 24. In a similar manner electron gun 21 produces an electron beam which is scanned across target portion 20 to produce an electrical signal corresponding to the luminance information contained in frame 15. The output from target portion 20 is coupled to luminance output terminal 25. This embodiment of the invention also allows the imaging of both the scene and the stripe pattern upon target areas 20 and 26 by imaging lens 16. System circuitry similar to that described above in FIG. 3 can be used with the system of FIG. 4 to provide direct heterodyne conversion to standard NTSC color signal form. An added advantage to the above-described system is its ability for easy removal of color encoding filter 19. Removal of color encoding filter 19 would be necessary when a record is used that is already color encoded, thereby allowing this system to be used for playback of a variety of other forms of prerecorded optical video records.

FIG. 5 shows another system embodying the invention. Light from source 10 directed to collimating lens 11 illuminates a color motion picture film 12 moving in the direction of arrow 13. Lens 11 is selected such that two frames (i.e., frames 14 and 15) are illuminated. The light passing through frame 14 is imaged by imaging lens 27 upon color encoding filter 19. Color encoding filter 19 is similar to those described in FIGS. 1 and 3 but has the added advantage of not being limited to the size of the image to be encoded. The size of filter 19 is determined by distance parameters and lens 27 and not by the size of the record as shown in FIG. 4. Color encoding filter 19 color encodes the information contained in frame 14. Light passing through frame 15 is unaltered. Imaging lens 16 images color encoded light information from frame 14 and light from unaffected frame 15 upon two portions of split target assembly 20 and 26 of image conversion device 17. Image conversion device 17, as described in FIG. 1 then converts the two images into two sets of electrical signals, a composite color signal and a luminance signal. The composite color signal is comprised of a color encoded signal containing color information of frame 14 as phase and amplitude modulation of a suppressed carrier wave and an index signal. The composite signal is coupled to chrominance output terminal 24. An electrical signal corresponding to the luminance information contained in frame 15 is coupled to luminance output terminal 25. System circuitry similar to that described in FIG. 3 is used for direct heterodyne conversion to standard NTSC color signal form of the electrical signals from output terminals 24 and 25 of bivicon 17.

The above system provides an advantage similar to that described in FIG. 4. Color encoding filter 19 can be removed when a record containing color encoded information is used. This system then has the ability to play back a variety of other forms of prerecorded optical video records.

What is claimed is:

1. A system for producing signals representative of the color and brightness of images contained on an optical record, comprising:

an image conversion device including a split photosensitive electrode assembly including first and second portions having separate signal output terminals, means for scanning said split portions of said electrode assembly simultaneously with first and second electron beams, respectively; and means for simultaneously imaging first and second successive frames of said record onto said first and second photosensitive electrode portions for producing during scanning a brightness representative signal obtained from said signal output terminal of said second electrode portion and a color signal representative of said plurality of colors obtained from said signal output terminal of said first electrode portion.

2. A system for producing signals representative of the color and brightness of color images contained on a color motion picture film, comprising:

an image conversion device including a split photosensitive electrode assembly including first and second portions having separate signal output terminals, means for scanning said split portions of said electrode assembly simultaneously with first and second electron beams, respectively;

a color encoding filter assembly disposed in an optical path of said first photosensitive electrode portion for encoding a plurality of colors impinging thereon; and means for simultaneously imaging first and second successive frames of said color motion picture film onto said first and second photosensitive electrode portions for producing during scanning a brightness representative signal obtained from said signal output terminal of said second electrode portion and a color signal representative of said plurality of colors obtained from said signal output terminal of said first electrode portion; and signal processing means coupled to said signal output terminals of said image conversion device for processing said brightness representative signals and said color signals.

3. A system for producing signals according to claim 2, wherein said color encoding filter assembly is disposed adjacent said image conversion device.

4. A system for producing signals according to claim 2, wherein said color encoding filter assembly is disposed substantially adjacent said color motion picture film.

5. A system for producing signals according to claim 2, wherein said means includes objective and relay optics wherein said color encoding filter assembly is disposed between said objective and relay optics.

6. A system for producing signals according to claim 2, wherein said color encoding filter assembly comprises a succession of groups of parallel stripe-like filter elements of light transmission characteristics chosen so that the signal obtained from said signal output terminal of said first electrode portion during scanning thereof comprises a composite signal including said color signal in the form of a phase and amplitude modulated carrier wave, and index signals of a nominal frequency bearing a submultiple relationship to the nominal frequency of said carrier wave, and wherein said signal processing means includes:

first low-pass filter means coupled to said signal output terminal of said second electrode portion for providing a filtered brightness representative signal;

first bandpass filter means coupled to said signal output terminal of said first electrode portion for separating said color signal from said composite signal;

second bandpass filter means coupled to said signal output terminal of said first electrode portion for separating said index signals from said composite signal; and heterodyning means coupled to said first and second bandpass filter means and responsive to said separated color signal and to said separated index signals for providing a frequency shifted color signal; and means coupled to said first low-pass filter means and to said heterodyning means for combining said filtered brightness representative signal and said frequency shifted color signal to provide an output composite signal.

7. A system for producing signals according to claim 6, wherein said heterodyning means includes:

a source of unmodulated carrier waves at a desired output carrier frequency;

first mixer means coupled to said first bandpass filter means and to said unmodulated carrier wave source for providing an output corresponding in frequency to the sum of the frequencies of said separated color signal and said unmodulated carrier waves;

frequency multiplier means coupled to said second bandpass filter means for providing a frequency multiplied index signal substantially equal in frequency to the carrier wave frequency of said separated color signal; and second mixer means coupled to said first mixer means and said multiplier means for providing said frequency shifted color signal in the form of a phase and amplitide modulated carrier wave of the desired output carrier frequency.

* * * * *